United States Patent
Ene-Pietrosanu et al.

(10) Patent No.: US 7,602,903 B2
(45) Date of Patent: Oct. 13, 2009

(54) CRYPTOGRAPHY CORRECTNESS DETECTION METHODS AND APPARATUSES

(75) Inventors: Monica Ene-Pietrosanu, Redmond, WA (US); Sermet Iskin, Redmond, WA (US); Rajesh Ramadoss, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 10/759,636

(22) Filed: Jan. 16, 2004

(65) Prior Publication Data
US 2005/0235342 A1 Oct. 20, 2005

(51) Int. Cl.
*H04L 9/00* (2006.01)
(52) U.S. Cl. .............................. 380/2; 380/1; 726/25
(58) Field of Classification Search ............... 380/1, 380/2; 726/25
See application file for complete search history.

(56) References Cited

U.S. PATENT DOCUMENTS

| | | | |
|---|---|---|---|
| 5,963,646 A * | 10/1999 | Fielder et al. | 380/259 |
| 6,308,266 B1 * | 10/2001 | Freeman | 713/156 |
| 6,397,330 B1 * | 5/2002 | Elgamal et al. | 713/164 |
| 6,931,532 B1 * | 8/2005 | Davis et al. | 713/167 |
| 7,051,067 B1 * | 5/2006 | Liu et al. | 709/203 |
| 7,079,648 B2 * | 7/2006 | Griffin et al. | 380/2 |
| 7,246,360 B2 * | 7/2007 | De Bonet | 719/328 |

* cited by examiner

*Primary Examiner*—Jung Kim
(74) *Attorney, Agent, or Firm*—Lee & Hayes, PLLC

(57) ABSTRACT

Methods and apparatuses are provided that can inform certain processes and/or even the user about the relative strength/weakness of cryptography services being used. In certain methods, for example, at least one cryptography service parameter threshold is established. The method further includes, selectively detecting a request for at least one cryptography service, and selectively performing at least one correctness detection action based on the requested cryptography service and the cryptography service parameter threshold. The cryptography service parameter threshold identifies acceptable/unacceptable cryptography algorithms, acceptable/unacceptable cryptography key size parameters, acceptable/unacceptable cryptography seed size parameters, and other like parameters that the requested cryptography service information can be compared with.

32 Claims, 7 Drawing Sheets

CRYPTOGRAPHY CORRECTNESS DETECTION METHODS AND APPARATUSES

TECHNICAL FIELD

The present invention relates generally to computers and like devices, and more particularly to methods and apparatuses that for detecting if cryptography information/services meet certain acceptable conditions from the security point of view for use by computing processes.

BACKGROUND

Cryptography services are typically provided in computing systems to support various security needs. These cryptography services employ different cryptography techniques and algorithms as needed to perform certain actions.

Cryptography techniques may be categorized as either symmetric cryptography or asymmetric cryptography. With symmetric cryptography, the same secret key is used for both encryption and decryption. This means that the symmetric key needs to be shared between the encrypting party and the decrypting party. Any party having a copy of the symmetric key may therefore decrypt and read a message. Hence, there is a need to protect and maintain control over the symmetric key. Security is provided through the protection of the key being used by the sender and the receiver. As long as only the sender and receiver know the secret symmetric key value, the message is protected (assuming a robust encryption algorithm and a cryptographically safe key size/seed are used).

Asymmetric cryptography (public key cryptography) is typically based on a "key pair". Here, one key in the pair is referred to as the "public" key. As the public directory, for example. The other key is referred to as the "private" key. Also consistent with its name, the private key is meant to be kept secret and secure by the party. Although the two keys are mathematically related, the private key cannot be determined from the public key, or at least doing so would likely be computationally infeasible.

Encryption and signing are two typical operations associated with public key cryptography. Data that is encrypted using a public key can only be decrypted using the associated private key and vice versa. Signing allows one to verify the source of a piece of data. Signing does not, however, protect the data from being viewed by anyone who has access to the sender's public key. In asymmetric cryptography, security is provided through the protection of the private keys.

Asymmetric cryptography is also often employed to provide authentication, non-repudiation and data integrity security mechanisms. Authentication provides assurance that a message was actually sent by the party indicated. Non-repudiation provides assurance that a sender cannot later deny having sent certain data. Data Integrity provides assurance that a message was not modified prior to reaching its destination.

These security mechanisms are typically provided by using a hash function in conjunction with public key cryptography. A hash function is basically an encoding scheme that is quick to compute and results in a relatively short numeric representation of the message that was hashed. Hash functions can be used to provide data integrity. First, a hash function is a one-way function, which means that one cannot retrieve the message from the resulting hash value. Second, the slightest change to the original message will result in a clearly detectable change of the hash value.

Some processes use a hash function in conjunction with public key cryptography to provide a security service often referred to as "signing" that ensures authentication and non-repudiation. For example, in certain systems, when a user signs a message, a hash of the message is calculated and then encrypted using the sender's private key. The resulting encrypted hash is referred to as the "digital signature". The original plaintext message, the digital signature, and the sender's certificate which contains the sender's public signing key are then sent to the recipient. Once received, the digital signature is decrypted using the sender's public key that was sent along with the message in the form of a certificate. The receiving client also generates a hash value for the plaintext message using the same hash function as did the sender. After the signature of the sender is decrypted with the sender's public key and the hash value recovered, the recovered hash value can then be compared with the generated hash value to detect differences. If the two hash values match, then the message must have originated from the sender who posses the private key. Hence, this provides authentication and non-repudiation. Furthermore, since this technique reliably detects if the message was changed/tampered during transit, data integrity is provided.

Cryptography services such as these and others are often handled "automatically" by the processes running on computing devices. This means, however, that such processes and/or users are sometimes not aware of the type of algorithm/key being used, nor if such algorithms/keys may be less secure than others that are available for use.

Consequently, for such reasons and others, there is a need for methods and apparatuses that can inform certain processes and/or even the user about the relative strength/weakness of cryptography services being used.

SUMMARY

Methods and apparatuses are provided that can inform certain processes and/or even the user about the relative strength/weakness of cryptography services being used.

The above stated needs and/or others are met, for example, by a method that includes establishing at least one cryptography service parameter threshold, selectively detecting a request for at least one cryptography service, and selectively performing at least one correctness detection action based on the requested cryptography service and the cryptography service parameter threshold.

The cryptography service parameter threshold may identify acceptable/unacceptable cryptography algorithms, acceptable/unacceptable cryptography key size parameters, acceptable/unacceptable cryptography seed size parameters, and other like parameters with which requested cryptography service information can be compared.

Algorithms, for example, may be categorized as being certified, old/out-of-date, weak, strong, etc. Key/seed lengths may also be compared to threshold lengths that are considered either weak or strong.

In certain implementations the method may also include performing actions, such as, for example, interrupting the application process, stopping the application process, starting at least one process to do further actions, displaying alert information, logging alert information, suggesting at least one alternative cryptography service, outputting alert messages, causing alteration of a graphical user interface, forcing use of at least one other cryptography service, etc., if the requested cryptography service is deemed to be "too weak".

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
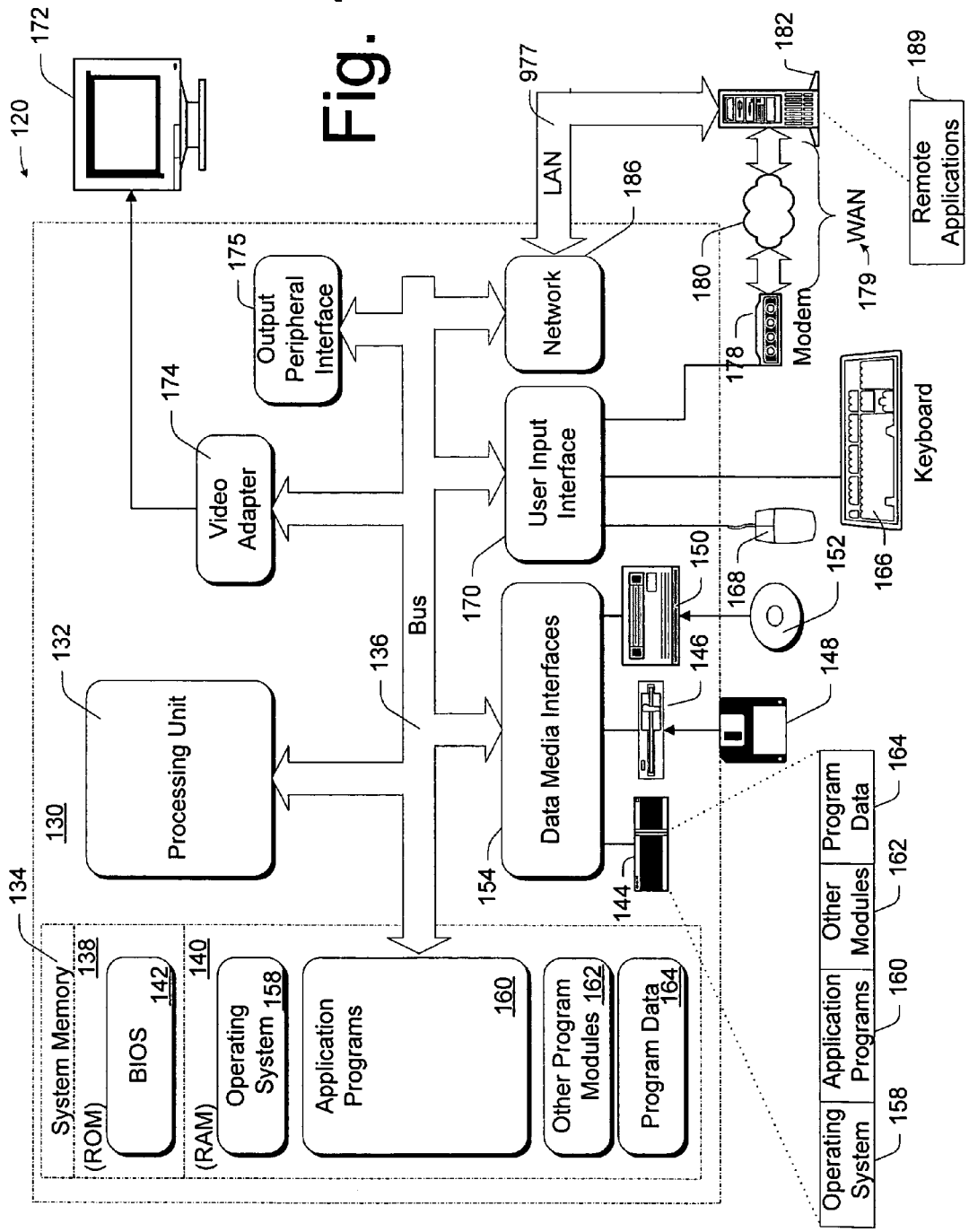
FIG. 1 is a block diagram that depicts a computer system configurable to provide cryptography services and cryptography correctness detection logic.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 with which the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
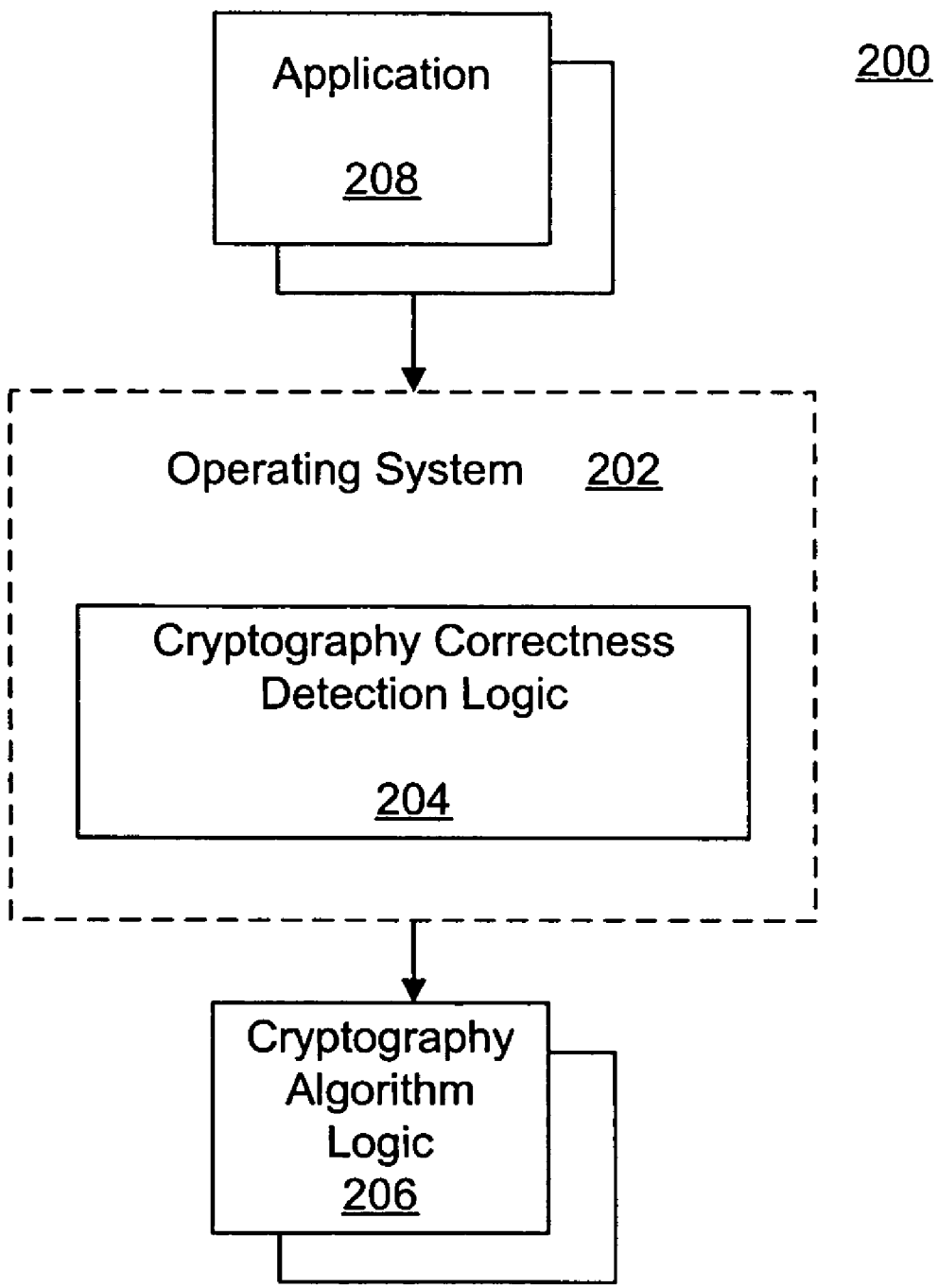
FIG. 2 is a block diagram depicting an example of certain computing processes including exemplary cryptography correctness detection logic and cryptography algorithm logic, for use in a computing device, for example, as depicted in FIG. 1.

Attention is now drawn to FIG. 2, which is a block diagram illustratively depicting certain computer-implementable processes 200 that are configured to operate together in a manner such that cryptographic services can be requested by certain processes and provided by other processes to the requesting process accordingly. The cryptographic services may include, for example, encryption services, decryption services, key generation services, key exchange services, digital signature services, etc. Typically, cryptographic services are requested or otherwise initiated by processes, such as applications, and the actual cryptography services performed by one or more other cryptography algorithm processes. The applications usually interact with the operating system through the application programming interfaces (API) to initiate the cryptography services.

Thus, for example, as depicted in FIG. 2 an operating system 202 contains interfaces (APIs) between an application 208 and cryptography algorithm logic 206. Included in operating system 202 is cryptography correctness detection logic 204. While illustrated in this example as being part of the operating system, in other implementations cryptography correctness detection logic 204 may be a process that is separate from operating system 202 but operatively coupled to operating system 202 to perform functions/acts accordingly.

Figure 3:
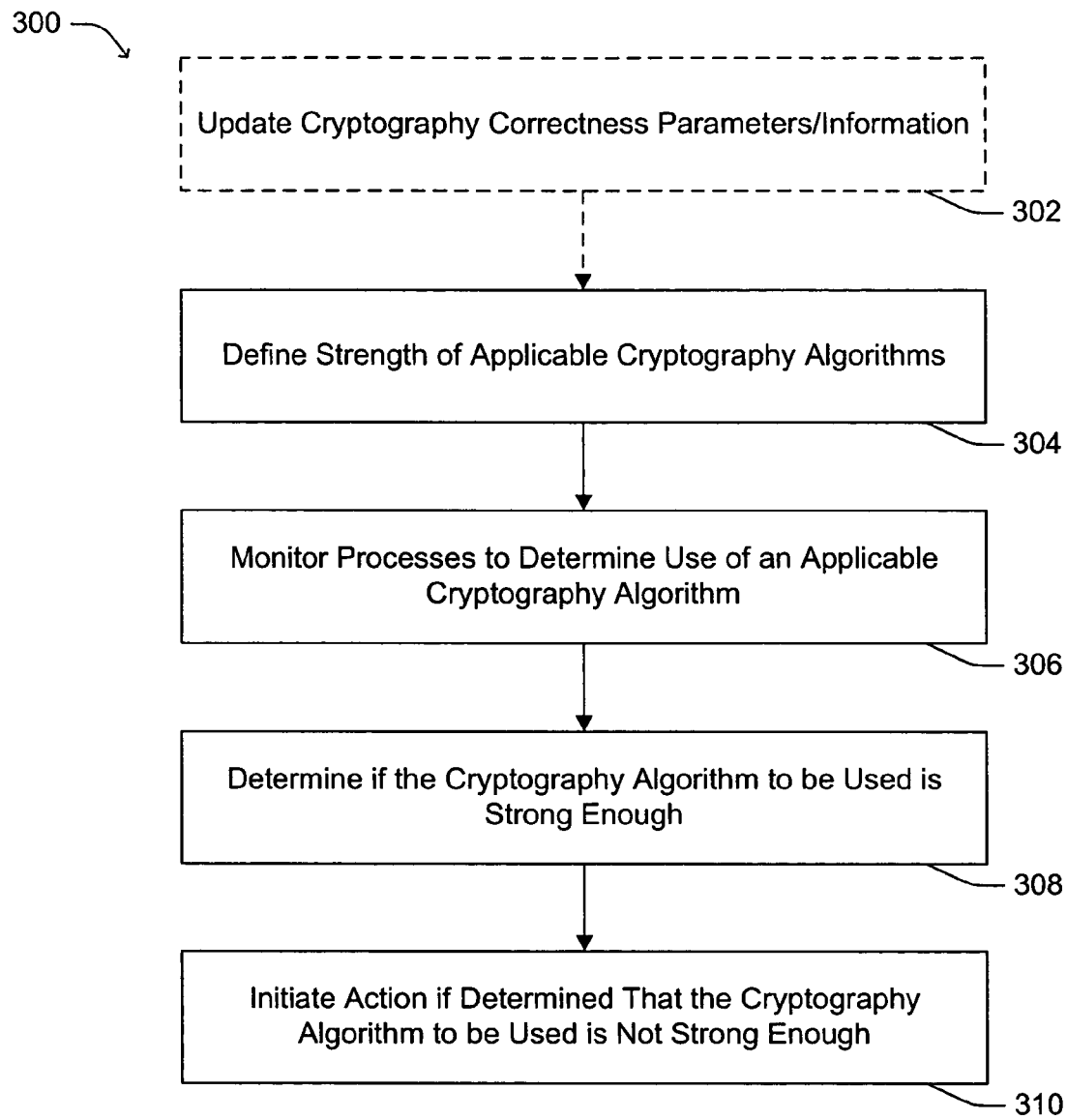
FIG. 3 is a flow diagram depicting certain exemplary acts associated with an exemplary method for use in cryptography correctness detection logic, for example, as in FIG. 2.

Attention is now drawn to FIG. 3, which is a flow diagram showing a method 300 that cryptography correctness detection logic 204 in the example in FIG. 2 can be configured to perform.

In act 302, which is optional, cryptography correctness parameter(s) and/or other like information are updated and maintained. This may include an initial establishment of the cryptography correctness parameter(s) and/or other like information, or the periodic or otherwise selective updating of cryptography correctness parameter(s) and/or other like information. As a result of act 302, cryptography correctness parameter(s) and/or other like information is configured and stored, for example, in a computer's memory. These cryptography correctness parameters may be configured according to the security requirements for the application and ma change in time according to the computational power available and advances made in cryptanalysis.

In act 304, the current relative "strength" for each available cryptography algorithm logic 206 is established. Here, for example, the cryptography correctness parameter(s) and/or other like information as provided in act 302 may include one or more cryptography service parameter thresholds. Such parameter thresholds can identify acceptable ("strong" enough) and/or unacceptable (too "weak") cryptography algorithms, or acceptable/unacceptable cryptography key size parameters. Cryptography algorithms can be specified using algorithm identifiers, version numbers, etc., and cryptography key size parameters can be identified by specifying acceptable/unacceptable bit lengths, for example.

In certain implementations, as part of acts 302/304, the cryptography service parameter threshold(s) are further associated with correctness categories. These correctness categories can, for example be employed to define the different algorithm identifiers, key lengths, etc., as being "old"/outdated algorithms, new/strong algorithms, weak keys, and strong keys.

The cryptography service parameter threshold may also identify acceptable/unacceptable seed type/size parameters associated with cryptography services, such as key generation.

In act 306, cryptography correctness detection logic 204 is configured to monitor on-going applicable processes to detect or otherwise be made aware of a request for or use of cryptography services from cryptography algorithm logic 206. For example, in certain implementations application 208 alerts operating system 202 as to a need for cryptography services. Cryptography correctness detection logic 204 is made aware of this request in act 306.

In act 306, various processes may be monitored; for example, application processes, operating system services, managed code application processes, or other processes calling into the cryptographic application programming interfaces (API) processes, and/or the like can be monitored.

In act 308, cryptography correctness detection logic 204 determines if the requested cryptography service/algorithm meets the conditions established in acts 302/304 via the cryptography correctness parameters/information. For example, in act 308 it can be determined if the identified cryptography algorithm is considered to be "strong" enough or too "weak" for a given process, time, user, data, etc. This may include, for example, determining a category for the algorithm/key. This may also include determining the type/length of a key to be used and comparing the type/length to applicable cryptography correctness parameters/information.

If, in act 308, it is determined that the requested cryptography service/algorithm satisfies the applicable cryptography correctness parameters/information, then the cryptography service/algorithm continues to execute accordingly. Information may be logged by cryptography correctness detection logic regarding the monitoring activities in act 306 and/or the determination made in act 308.

To the contrary, if, in act 308, it is determined that the requested cryptography service/algorithm fails to satisfy the applicable cryptography correctness parameters/information, then the cryptography service/algorithm continues with act 310.

In act 310, one or more actions may be initiated or otherwise performed by cryptography correctness detection logic 204. By way of example, actions may include interrupting the application process, stopping the application process, starting at least one process to perform further correction/notification actions, displaying alert information, logging alert information, suggesting at least one alternative cryptography service, outputting alert messages, causing alteration of a graphical user interface, and/or forcing use of at least one other cryptography algorithm/service instead of the requested algorithm/service.

In this manner, cryptography correctness detection logic 204 can be configured to support or enforce specific security/policy requirements depending on the device/user/situation. Thus, in certain implementations, when a "weak" algorithm/key is detected by cryptography correctness detection logic 204, then the algorithm/key may be flagged accordingly to alert the program, user, administrator, etc., about the use of a weak algorithm/key/seed, while also allowing the requested cryptography service to continue. In other stricter implementations, a requested cryptography service that is deemed to be too weak may not be continued or otherwise refused to occur. In still other examples, an implementation may actively suggest one or more different, i.e., "stronger", algorithms/keys/seeds. Here, a user can be presented with and selectively authorize such substitution. In still other implementations, such a substitution may be made automatically or at least initiated automatically by cryptography correctness detection logic 204. Information may also be logged by cryptography correctness detection logic 204 regarding the actions initiated in act 310.

FIGS. 4-9 provide additional description for use in logic 204 and/or method 300 in accordance with certain further illustrative examples.

Figure 4:
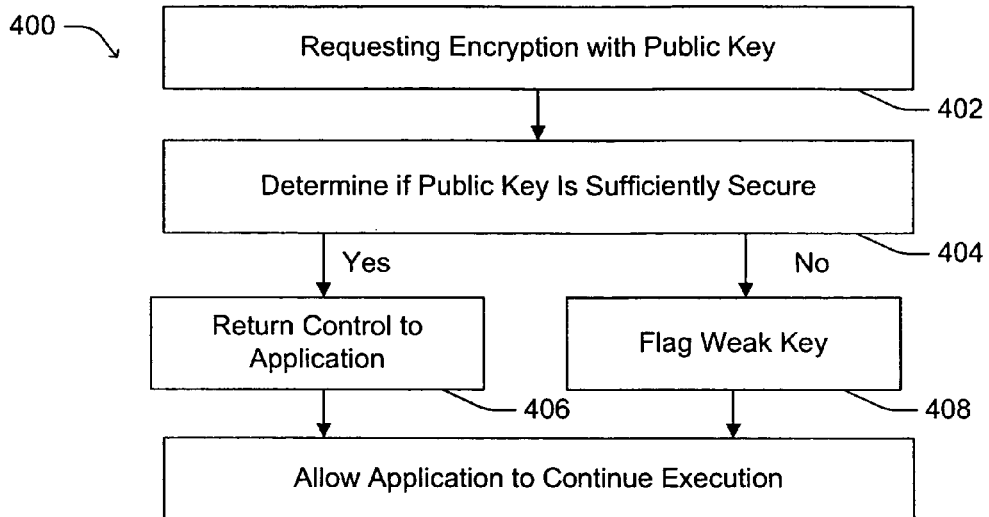
FIG. 4 is a flow diagram depicting certain exemplary acts associated with an exemplary method for use in cryptography correctness detection logic when asymmetric key encryption is requested.

FIG. 4 is a flow diagram depicting certain exemplary acts associated with an exemplary method 400 for use in cryptography correctness detection logic 204 when asymmetric/public key encryption is requested. In act 402, a request for encryption services with a public key is made by application 208, for example. In act 404, it is determined if the public key is sufficiently secure enough for the present operation. For example, in act 404 the size of the public key may be compared to a minimum acceptable public key size (e.g., greater than or equal to N bits, with N currently equal to 1024). In act 406, the public key is sufficiently secure and therefore control is returned to the application or other applicable process. In act 408, the public key is deemed to be not sufficiently secure and therefore action is initiated in the form of a flag weak key action. In act 410, processes continue to execute accordingly.

Figure 5:
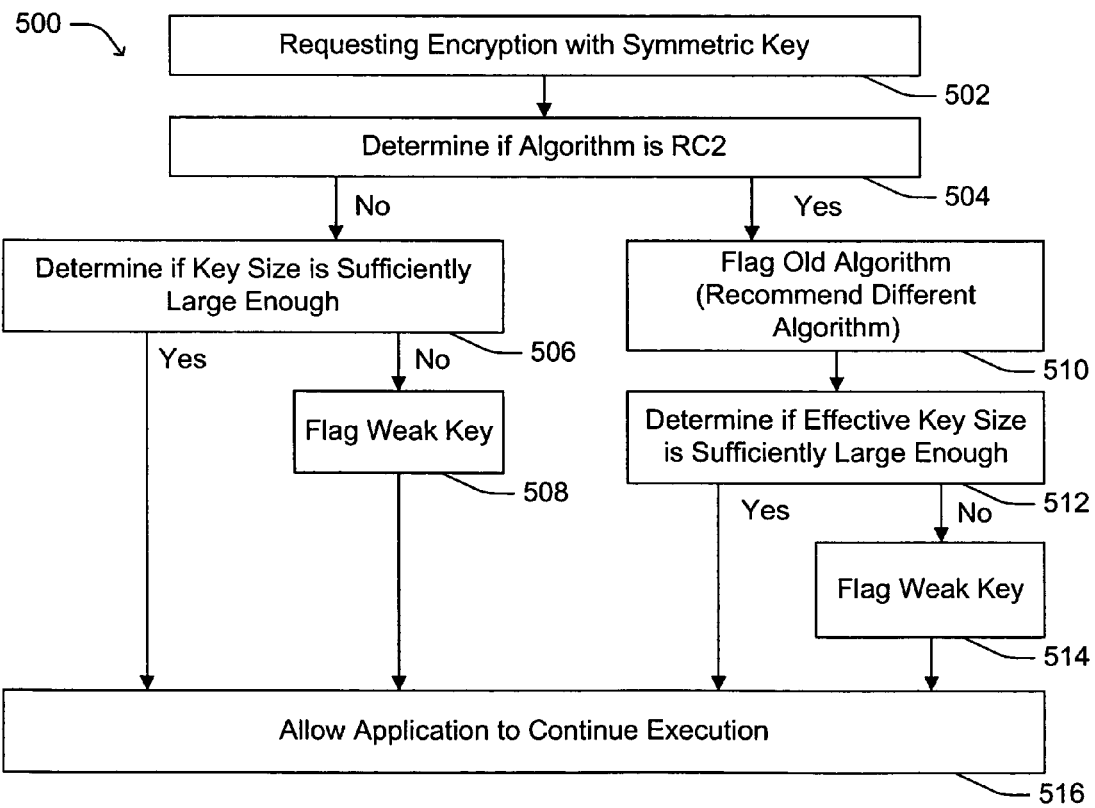
FIG. 5 is a flow diagram depicting certain exemplary acts associated with an exemplary method for use in cryptography correctness detection logic when symmetric key encryption is requested.

FIG. 5 is a flow diagram depicting certain exemplary acts associated with an exemplary method 500 for use in cryptography correctness detection logic 204 when symmetric key encryption is requested. In act 502, a request for encryption services with a symmetric key is made by application 208, for example. In act 504, it is determined if the cryptography algorithm is an RC2 algorithm. In act 506, the algorithm is not the RC2 algorithm, and it is determined if the symmetric key is sufficiently secure, e.g., based on its size (length in bits) (e.g., less than K bits, with K currently equal to 128). If the symmetric key is deemed sufficiently secure, then control is returned to the application or other applicable process in act 516. If the symmetric key is deemed to not be sufficiently secure, then in act 508 action is initiated in the form of a flag weak key action and the method continues with act 516.

Retuning to act 504, if the algorithm is determined to be RC2, then in method 500 continues with act 510, in which action is initiated in the form of a flag old algorithm action. This action may include recommending a substitute algorithm. In act 512, it is determined if the effective key size is sufficiently secure, e.g., based on its size (length in bits) (e.g., less than M bits, with M currently equal to 128). If the symmetric key is deemed sufficiently secure, then control is returned to the application or other applicable process in act 516. If the symmetric key is deemed to not be sufficiently secure, then in act 514 action is initiated in the form of a flag weak key action and the method continues with act 516.

Figure 6:
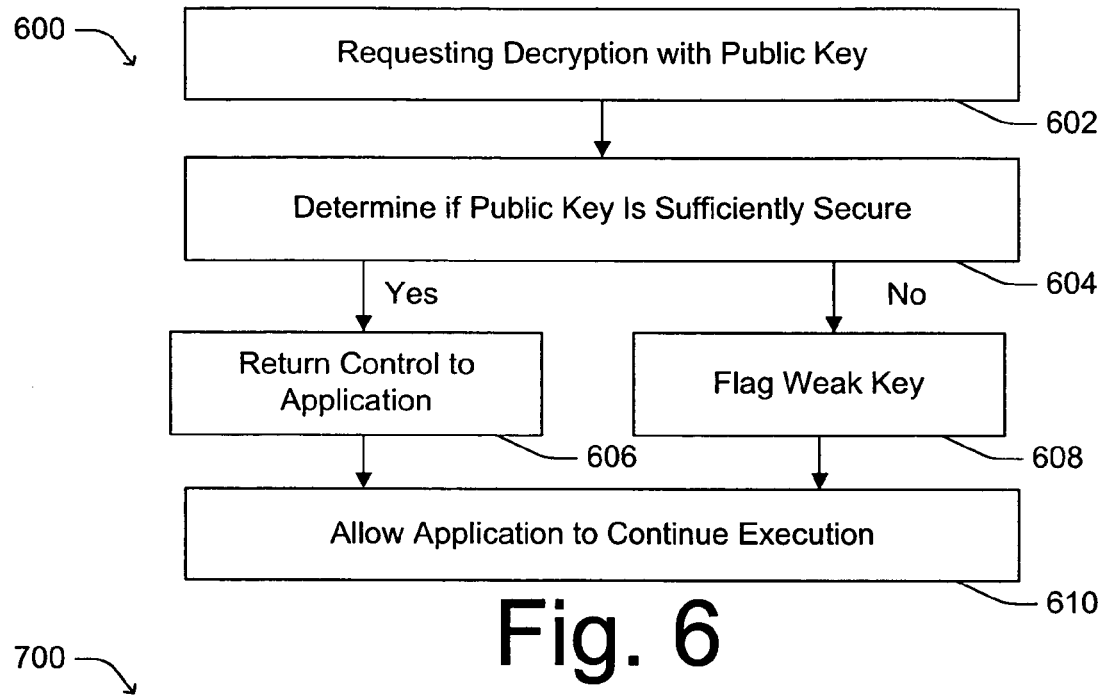
FIG. 6 is a flow diagram depicting certain exemplary acts associated with an exemplary method for use in cryptography correctness detection logic when asymmetric key decryption is requested.

FIG. 6 is a flow diagram depicting certain exemplary acts associated with an exemplary method 600 for use in cryptography correctness detection logic 204 when asymmetric key decryption is requested. In act 602, a request for decryption services with a public key is made by application 208, for example. In act 604, it is determined if the public key is sufficiently secure enough for the present operation. For example, in act 604 the size of the public key may be compared to a minimum acceptable public key size (e.g., greater than or equal to N bits, with N currently equal to 1024). In act 606, the public key is sufficiently secure and therefore control is returned to the application or other applicable process. In act 608, the public key is deemed to be not sufficiently secure and therefore action is initiated in the form of a flag weak key action. In act 610, processes continue to execute accordingly.

Figure 7:
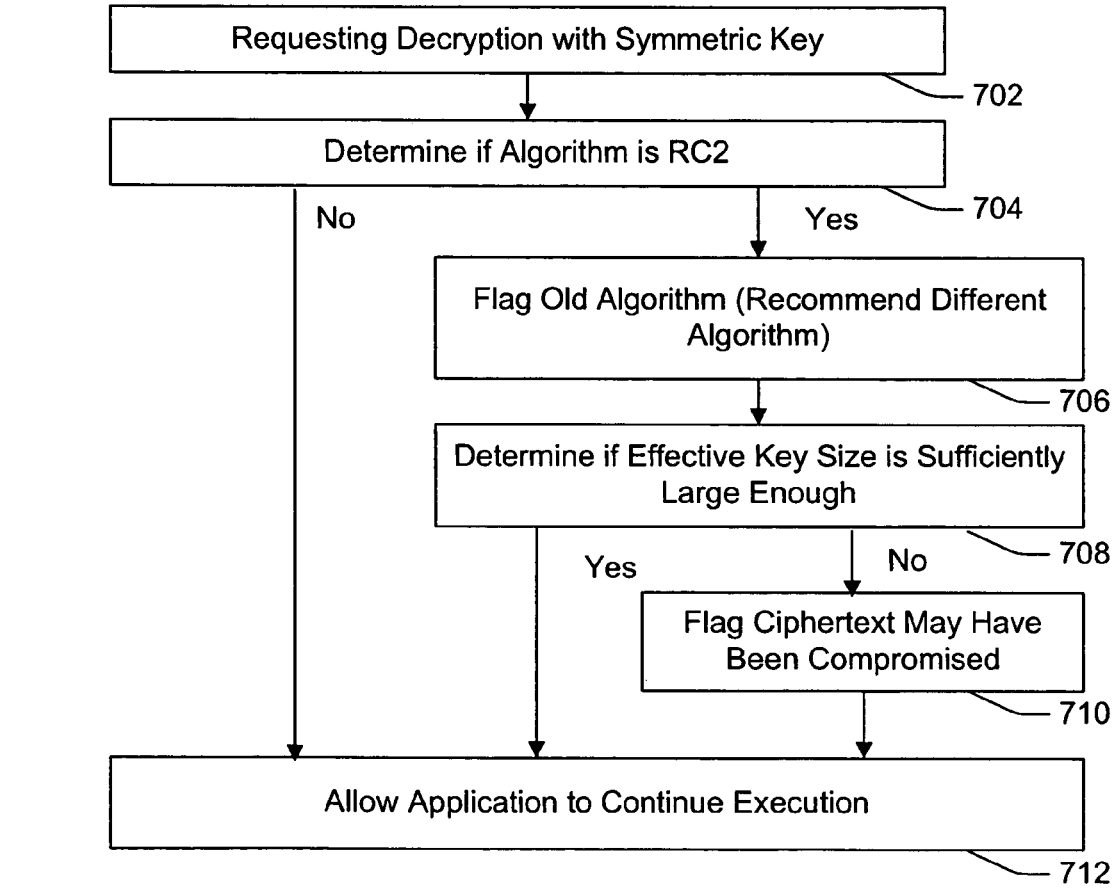
FIG. 7 is a flow diagram depicting certain exemplary acts associated with an exemplary method for use in cryptography correctness detection logic when symmetric key decryption is requested.

FIG. 7 is a flow diagram depicting certain exemplary acts associated with an exemplary method 700 for use in cryptography correctness detection logic 204 when symmetric key decryption is requested. In act 702, a request for decryption services with a symmetric key is made by application 208, for example. In act 704, it is determined if the cryptography algorithm is an RC2 algorithm. If the algorithm is not RC2, then method 700 continues with act 712 and processes continue to execute accordingly. If the algorithm is RC2, then method 700 continues with act 706.

In act 706 action is initiated in the form of a flag old algorithm action. This action may include recommending a substitute algorithm. In act 708, it is determined if the effective key size is sufficiently secure, e.g., based on its size (length in bits) (e.g., less than M bits, with M currently equal to 128). If the symmetric key is deemed sufficiently secure, then control is returned to the application or other applicable process in act 712. If the symmetric key is deemed to not be sufficiently secure, then in act 710 action is initiated in the form of a flag weak ciphertext may have been compromised action and the method continues with act 712.

Figure 8:
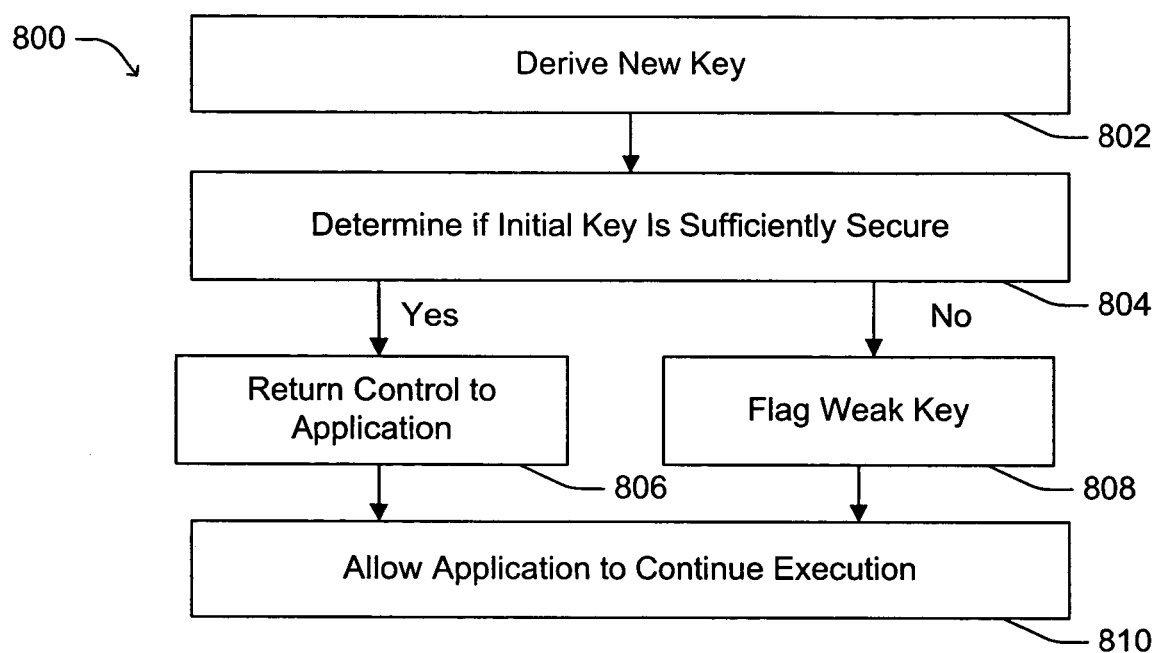
FIG. 8 is a flow diagram depicting certain exemplary acts associated with an exemplary method for use in cryptography correctness detection logic when a new key is derived.

FIG. 8 is a flow diagram depicting certain exemplary acts associated with an exemplary method 800 for use in cryptography correctness detection logic 204 when deriving a new key (e.g., based on a seed). In act 802, a request for encryption services providing a new key is made by application 208, for example. In act 804, it is determined if the initial key (or seed) from which the new key is to be derived from is sufficiently secure enough for the present operation. For example, in act 804 the size of the initial key or seed may be compared to a minimum acceptable initial key or seed size. In act 806, the initial key or seed is sufficiently secure and therefore control is returned to the application or other applicable process. In act 808, the initial key or seed is deemed to be not sufficiently secure and therefore action is initiated in the form of a flag weak key action. In act 810, processes continue to execute accordingly.

Figure 9:
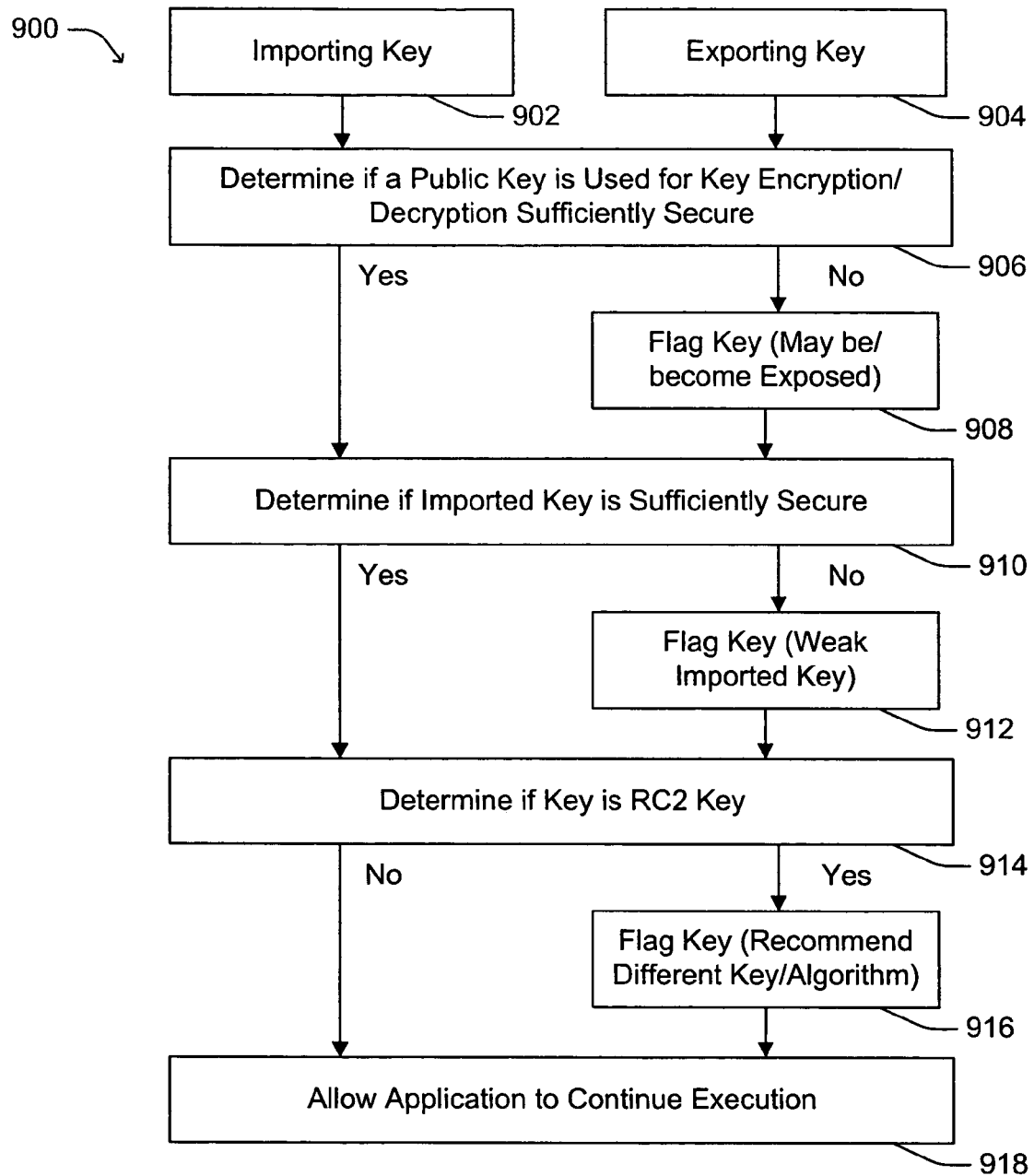
FIG. 9 is a flow diagram depicting certain exemplary acts associated with an exemplary method for use in cryptography correctness detection logic when a key is imported or exported.

FIG. 9 is a flow diagram depicting certain exemplary acts associated with an exemplary method 900 for use in cryptography correctness detection logic 204 when a key is imported or exported. In act 902, a request for encryption services includes importing a key. In act 904, a request for encryption services includes exporting a key.

In act 906, it is determined if a public key that is used for key encryption/decryption of the imported/exported key is sufficiently secure enough for the present operation. For example, in act 906 the size of the public key may be compared to a minimum acceptable public key size. If, in act 908, the public key is deemed to be sufficiently secure, then method 900 continues with act 910. If, in act 908, the public key is deemed to not be sufficiently secure, then method 900 continues with act 908 and action is initiated in the form of a flag weak key action because the imported/exported key may have been (or may become) exposed or otherwise more easily compromised.

In act 910, it is determined if an imported key is sufficiently secure enough for the present operation. For example, in act 910 the size of the imported key may be compared to a minimum acceptable importable key size. If, in act 910, the imported key is deemed to be sufficiently secure, then method 900 continues with act 914. If, in act 908, the imported key is deemed to not be sufficiently secure, then method 900 continues with act 912 and action is initiated in the form of a flag weak key action because the imported key may have been exposed or otherwise more compromised.

In act 914, it is determined if an imported/exported key is an RC2 key. If, in act 914 the imported/exported key is not an RC2 key, then method 900 continues with act 918. If the imported/exported key is an RC2 key, then method 900 continues with act 916 and action is initiated in the form of a flag key action. This action may include recommending a substitute key/algorithm. In act 918, processes continue to execute accordingly.

In this section some current cryptography algorithms are identified by common their request calls and/or name. Some of these algorithms, for example, are already deemed to be less secure (weak) when compared to others that are currently considered "strong". Those skilled in the art will clearly recognize that this exemplary list may be increased or decreased in size and the suggested relative strengths of the algorithms will likely need to change over time as new developments in the field of cryptography are developed.

| Algorithm internal identifier | Message displayed and recommendation |
| --- | --- |
| CALG_MD2 | MD2 hashing (weak algorithm) |
| CALG_MD4 | MD4 Hashing (weak algorithm) |
| CALG_MD5 | MD5 Hashing (strong algorithm) |
| CALG_SHA1 | SHA1 Hashing (strong algorithm) |
| CALG_MAC | MAC Hashing |
| CALG_RSA_SIGN | RSA signing |
| CALG_DSS_SIGN | DSS signing |
| CALG_NO_SIGN | CALG_NO_SIGN: No signature |
| CALG_RSA_KEYX | RSA key exchange |
| CALG_DES | DES (weak encryption) |
| CALG_3DES_112 | 3DES-2 key encryption (strong algorithm) |
| CALG_3DES | 3DES-3 key (strong algorithm) |
| CALG_DESX | DESX encryption |
| CALG_RC2 | RC2 (old encryption, use newer if possible) |
| CALG_RC4 | RC4 (strong algorithm) |
| CALG_RC5 | RC5 (weak algorithm) |
| CALG_AES_128 | AES_128 (strong algorithm) |
| CALG_AES_192 | AES_192 (strong algorithm) |
| CALG_AES_256 | AES_256 (strong algorithm) |
| CALG_AES | Generic AES encryption (strong algorithm) |
| CALG_SEAL | CALG_SEAL encryption |
| CALG_DH_SF | CALG_DH_SF: Diffie-Hellman (store and forward) key agreement |
| CALG_DH_EPHEM | CALG_DH_EPHEM: Diffie-Hellman (ephemeral) key agreement"}, |
| CALG_AGREEDKEY_ANY | CALG_AGREEDKEY_ANY: (any other key agreement) |
| CALG_KEA_KEYX | CALG_KEA_KEYX: KEA key exchange"}, |
| CALG_HUGHES_MD5 | CALG_HUGHES_MD5: (Hughes MD5 hashing) |
| CALG_SKIPJACK | CALG_SKIPJACK: Skipjack encryption |
| CALG_TEK | CALG_TEK: TEK encryption |
| CALG_CYLINK_MEK | CALG_CYLINK_MEK: (Cylink MEK encryption) |
| CALG_SSL3_SHAMD5 | CALG_SSL3_SHAMD5: (for SSL3) |
| CALG_SSL3_MASTER | CALG_SSL3_MASTER: (Master key encryption for SSL3) |
| CALG_SCHANNEL_MASTER_HASH | CALG_SCHANNEL_MASTER_HASH (Master key hashing for Schannel) |
| CALG_SCHANNEL_MAC_KEY | CALG_SCHANNEL_MAC_KEY (MAC for Schannel) |
| CALG_SCHANNEL_ENC_KEY | CALG_SCHANNEL_ENC_KEY |
| CALG_PCT1_MASTER | CALG_PCT1_MASTER (old algorithm, suggest upgrade to newer) |
| CALG_SSL2_MASTER | CALG_SSL2_MASTER (weak algorithm) |
| CALG_TLS1_MASTER | CALG_TLS1_MASTER (strong algorithm) |
| CALG_HMAC | CALG_HMAC: MAC with key |
| CALG_TLS1PRF | CALG_TLS1PRF |
| CALG_HASH_REPLACE_OWF | CALG_HASH_REPLACE_OWF |
| CALG_SHA_256 | CALG_SHA_256 hashing for AES (strong algorithm) |
| CALG_SHA_384 | CALG_SHA_384 hashing for AES (strong algorithm) |
| CALG_SHA_512 | CALG_SHA_512 hashing for AES (strong algorithm) |

Although some preferred implementations of the various methods and apparatuses have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A computer implemented method comprising:
   establishing, via the computer, at least one cryptography service parameter threshold comprising a minimum level of security;
   establishing, via the computer, at least one maximum cryptography service parameter threshold;
   wherein establishing said at least one of either said minimum or maximum cryptography service parameter threshold includes establishing a plurality of correctness categories, wherein each at least one of said plurality of correctness categories includes at least one cryptography algorithm identifier and said plurality of correctness categories includes at least one correctness category selected from a group of correctness categories consisting of authorized algorithms, unauthorized algorithms, weak algorithms, and strong algorithms;
   maintaining said at least one of said minimum and maximum cryptography service parameter thresholds in memory;
   selectively detecting, via the computer, a request from an application submitted via an application programming interface to an operating system of the computer, the request comprising a request for at least one cryptography service at the computer; and
   selectively performing, via the computer, at least one correctness detection action responsive to detecting the request based on the requested cryptography service and the at least one cryptography service parameter threshold in the memory, wherein:
   the at least one correctness detection action selectively performed includes suggesting at least one alternative cryptography service;
   the at least one alternative cryptography service comprises a cryptography service which meets the minimum level of security; and
   the selectively performing at least one correctness detection action based on the requested cryptography service and the at least one cryptography service parameter threshold in the memory includes determining if a cryptographic key associated with the requested cryptography service is suitable for use based on the at least one cryptography service parameter threshold in the memory, wherein determining if the cryptographic key associated with the requested cryptography service is suitable for use based on the at least one cryptography service parameter threshold in the memory includes comparing a size of the cryptographic key with the at least one cryptography service parameter threshold in the memory, wherein the size of the cryptographic key is identified by bit length.

2. The computer implemented method as recited in claim 1, wherein establishing, via the computer, said at least one cryptography service parameter threshold includes at least identifying unacceptable cryptography algorithms.

3. The computer implemented method as recited in claim 1, wherein establishing, via the computer, said at least one cryptography service parameter threshold includes at least identifying acceptable cryptography algorithms.

4. The computer implemented method as recited in claim 1, wherein establishing, via the computer, said at least one cryptography service parameter threshold includes at least identifying at least one acceptable seed size parameter.

5. The computer implemented method as recited in claim 1, wherein establishing, via the computer, said at least one cryptography service parameter threshold includes at least identifying at least one unacceptable seed size parameter.

6. The computer implemented method as recited in claim 1, wherein selectively detecting, via the computer, said request for at least one cryptography service includes monitoring at least one process selected from a group of processes comprising an application, an operating system, a cryptography system service, and another process calling into the cryptography application programming interfaces.

7. The computer implemented method as recited in claim 1, wherein selectively performing, via the computer, said at least one correctness detection action based on said requested cryptography service and said at least one cryptography service parameter threshold in the memory includes determining if a cryptographic algorithm associated with said requested cryptography service is suitable for use based on said at least one cryptography service parameter threshold in the memory.

8. The computer implemented method as recited in claim 7, wherein determining if said cryptographic algorithm associated with said requested cryptography service is suitable for use based on said at least one cryptography service parameter threshold in the memory further includes comparing a cryptography algorithm identifier with said at least one cryptography service parameter threshold in the memory.

9. The computer implemented method as recited in claim 1, wherein selectively performing, via the computer, said at least one correctness detection action based on said requested cryptography service and said at least one cryptography service parameter threshold in the memory includes performing at least one action selected from a group of actions consisting of:
   interrupting at least one process;
   stopping at least one process;
   starting at least one process;
   displaying alert information;
   logging alert information;
   suggesting at least one alternative cryptography service;
   outputting alert messages;
   causing alteration of a graphical user interface; and
   forcing use of at least one other cryptography service.

10. A computer readable medium having computer-implementable instructions embodied thereon, which when executed cause one or more processing units to perform acts comprising:
    establishing at least one cryptography service parameter threshold comprising a minimum cryptography service parameter threshold;
    establishing at least one maximum cryptography service parameter threshold;
    wherein establishing said at least one of either said minimum or maximum cryptography service parameter threshold includes establishing a plurality of correctness categories, wherein each at least one of said plurality of correctness categories includes at least one cryptography algorithm identifier and said plurality of correctness categories includes at least one correctness category selected from a group of correctness categories consisting of authorized algorithms, unauthorized algorithms, weak algorithms, and strong algorithms;
    maintaining said at least one of said minimum and maximum cryptography service parameter thresholds in memory;
    selectively detecting a request from an application submitted via an application programming interface to an operating system, the request comprising a request for at least one cryptography service; and
    selectively performing at least one correctness detection action responsive to detecting the request based on said requested cryptography service and said at least one cryptography service parameter threshold in the memory, wherein:

the at least one correctness detection action selectively performed includes forcing use of at least one alternative cryptography service;

the at least one alternative cryptography service comprises a cryptography service which meets the minimum level of security; and the selectively performing at least one correctness detection action based on the requested cryptography service and the at least one cryptography service parameter threshold in the memory includes determining if a cryptographic key associated with the requested cryptography service is suitable for use based on the at least one cryptography service parameter threshold in the memory, wherein determining if the cryptographic key associated with the requested cryptography service is suitable for use based on the at least one cryptography service parameter threshold in the memory includes comparing a size of the cryptographic key with the at least one cryptography service parameter threshold in the memory, wherein the size of the cryptographic key is identified by bit length.

11. The computer readable medium as recited in claim 10, wherein establishing said at least one of either said minimum or maximum cryptography service parameter threshold includes at least one of the following acts:

identifying unacceptable cryptography algorithms; and identifying acceptable cryptography algorithms.

12. The computer readable medium as recited in claim 10, wherein establishing said at least one of either said minimum or maximum cryptography service parameter threshold includes at least one of the following acts:

identifying at least one unacceptable cryptography key size parameter; and identifying at least one acceptable cryptography key size parameter.

13. The computer readable medium as recited in claim 10, wherein establishing said at least one of either said minimum or maximum cryptography service parameter threshold includes at least one of the following acts:

identifying at least one acceptable seed size parameter; and identifying at least one unacceptable seed size parameter.

14. The computer readable medium as recited in claim 10, wherein selectively detecting said request for at least one cryptography service includes monitoring at least one process selected from a group of processes comprising an application, an operating system, a cryptography algorithm, and a cryptography application programming interface.

15. The computer readable medium as recited in claim 10, wherein selectively performing said at least one correctness detection action based on said requested cryptography service if said requested cryptography service does not satisfy said at least one cryptography service parameter threshold in the memory includes determining if a cryptographic key associated with said requested cryptography service is suitable for use based on said at least one cryptography service parameter threshold in the memory.

16. The computer readable medium as recited in claim 15, wherein determining if said cryptographic key associated with said requested cryptography service is suitable for use based on said at least one cryptography service parameter threshold in the memory includes comparing a size of said cryptographic key with said at least one cryptography service parameter threshold in the memory.

17. The computer readable medium as recited in claim 10, wherein selectively performing said at least one correctness detection action based on said requested cryptography service if said requested cryptography service does not satisfy said at least one cryptography service parameter threshold in the memory includes determining if a cryptographic algorithm associated with said requested cryptography service is suitable for use based on said at least one cryptography service parameter threshold in the memory.

18. The computer readable medium as recited in claim 17, wherein determining if said cryptographic algorithm associated with said requested cryptography service is suitable for use based on said at least one cryptography service parameter threshold in the memory further includes comparing a cryptography algorithm identifier with said at least one cryptography service parameter threshold in the memory.

19. The computer readable medium as recited in claim 10, wherein selectively performing said at least one correctness detection action based on said requested cryptography service if said requested cryptography service does not satisfy said at least one cryptography service parameter threshold in the memory includes performing at least one action selected from a group of actions consisting of:

interrupting at least one process, stopping at least one process, starting at least one process, displaying alert information, logging alert information, suggesting at least one alternative cryptography service, outputting alert messages, and causing alteration of a graphical user interface.

20. An apparatus comprising:

a system memory;

a processing unit; and programmable instructions stored on the system memory and executable by the processing unit to configure the apparatus to:

establish at least one cryptography service parameter threshold, wherein the at least one cryptography service parameter threshold comprises a threshold setting a minimum level of security;

establish at least one maximum cryptography service parameter threshold;

maintain said at least one of said minimum and maximum cryptography service parameter thresholds in said memory; and establish a plurality of correctness categories in said memory, wherein each at least one of said plurality of correctness categories includes at least one cryptography algorithm identifier wherein said plurality of correctness categories includes at least one correctness category selected from a group of correctness categories consisting of authorized algorithms, unauthorized algorithms, weak algorithms, and strong algorithms;

selectively detect a request for at least one cryptography service; and selectively perform at least one correctness detection action based on said requested cryptography service if said requested cryptography service does not satisfy at least one cryptography service parameter threshold in said memory, wherein the at least one correctness detection action selectively performed includes forcing use of at least one other cryptography service, wherein the at least one other cryptography service comprises a cryptography service having a higher level of security than represented by the cryptography service parameter threshold.

21. The apparatus as recited in claim 20, wherein said cryptography correctness detection logic is further configured to identify at least one of the following: at least one unacceptable cryptography algorithm, and at least one acceptable cryptography algorithm.

22. The apparatus as recited in claim 20, wherein said cryptography correctness detection logic is further configured to identify at least one of the following: at least one unacceptable cryptography key size parameter; and at least one acceptable cryptography key size parameter.

23. The apparatus as recited in claim 20, wherein said cryptography correctness detection logic is further configured to identify at least one of the following: at least one acceptable seed size parameter; and at least one unacceptable seed size parameter.

24. The apparatus as recited in claim 20, wherein said cryptography correctness detection logic is further configured to monitor at least one process selected from a group of processes comprising an application, an operating system, a cryptography algorithm, and a cryptography application programming interface.

25. The apparatus as recited in claim 20, wherein said cryptography correctness detection logic is further configured to determine if a cryptographic key associated with said requested cryptography service is suitable for use based on said at least one cryptography service parameter threshold in said memory.

26. The apparatus as recited in claim 25, wherein said cryptography correctness detection logic is further configured to compare a size of said cryptographic key with said at least one cryptography service parameter threshold in said memory.

27. The apparatus as recited in claim 20, wherein said cryptography correctness detection logic is further configured to determine if a cryptographic algorithm associated with said requested cryptography service is suitable for use based on said at least one cryptography service parameter threshold in said memory.

28. The apparatus as recited in claim 27, wherein said cryptography correctness detection logic is further configured to compare a cryptography algorithm identifier with said at least one cryptography service parameter threshold in said memory.

29. The apparatus as recited in claim 28, wherein said cryptography correctness detection logic is further configured to use at least one action selected from a group of actions consisting of:
  interrupting at least one process,
  stopping at least one process,
  starting at least one process,
  displaying alert information,
  logging alert information,
  suggesting at least one alternative cryptography service,
  outputting alert messages, and
  causing alteration of a graphical user interface, to be performed.

30. The method as recited in claim 1, wherein: in an event that the cryptography service is an asymmetric cryptography service, the minimum level of security comprises a minimum acceptable public key size of at least 1024 bits; and in an event that the cryptography service is a symmetric cryptography service, the minimum level of security comprises a minimum acceptable symmetric key size of at least 128 bits.

31. The computer readable medium as recited in claim 10, wherein: the at least one alternative cryptography service comprises a cryptography service which meets the minimum level of security; and the selectively performing at least one correctness detection action based on the requested cryptography service and the at least one cryptography service parameter threshold in the memory includes determining if a cryptographic key associated with the requested cryptography service is suitable for use based on the at least one cryptography service parameter threshold in the memory, wherein determining if the cryptographic key associated with the requested cryptography service is suitable for use based on the at least one cryptography service parameter threshold in the memory includes comparing a size of the cryptographic key with the at least one cryptography service parameter threshold in the memory, wherein the size of the cryptographic key is identified by bit length.

32. The apparatus of claim 20 wherein the selectively performing at least one correctness detection action based on the requested cryptography service and the at least one cryptography service parameter threshold in said memory includes determining if a cryptographic key associated with the requested cryptography service is suitable for use based on the at least one cryptography service parameter threshold in said memory, wherein determining if the cryptographic key associated with the requested cryptography service is suitable for use based on the at least one cryptography service parameter threshold in said memory includes comparing a size of the cryptographic key with the at least one cryptography service parameter threshold in said memory, wherein the size of the cryptographic key is identified by bit length.

* * * * *

UNITED STATES PATENT AND TRADEMARK OFFICE
CERTIFICATE OF CORRECTION

| | | |
|---|---|---|
| PATENT NO. | : 7,602,903 B2 | Page 1 of 1 |
| APPLICATION NO. | : 10/759636 | |
| DATED | : October 13, 2009 | |
| INVENTOR(S) | : Monica Ene-Pietrosanu et al. | |

It is certified that error appears in the above-identified patent and that said Letters Patent is hereby corrected as shown below:

In column 1, line 33, after "the" insert -- name implies, a public key may be shared with others and even published in a --.

In column 15, line 42, in Claim 29, delete "28" and insert -- 20 --, therefor.

Signed and Sealed this
Eighth Day of February, 2011

David J. Kappos
*Director of the United States Patent and Trademark Office*